United States Patent
Toda et al.

(10) Patent No.: US 6,808,312 B1
(45) Date of Patent: Oct. 26, 2004

(54) BEARING DEVICE AND METHOD OF MANUFACTURING THE BEARING DEVICE

(75) Inventors: Kazutoshi Toda, Osaka (JP); Shinichirou Kashiwagi, Osaka (JP); Tomohiro Ishii, Osaka (JP); Tadashi Mitarai, Osaka (JP); Daisaku Tomita, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 112 days.

(21) Appl. No.: 10/362,336
(22) PCT Filed: Aug. 13, 2001
(86) PCT No.: PCT/JP01/06966
§ 371 (c)(1), (2), (4) Date: Feb. 20, 2003
(87) PCT Pub. No.: WO02/16791
PCT Pub. Date: Feb. 28, 2002

(30) Foreign Application Priority Data

Aug. 21, 2000 (JP) .......... 2000-249300

(51) Int. Cl.$^7$ .......... F16C 43/04; B23P 15/00
(52) U.S. Cl. .......... 384/544; 29/898.07
(58) Field of Search .......... 384/544, 589; 29/898.06–898.07

(56) References Cited

U.S. PATENT DOCUMENTS

| | | | | |
|---|---|---|---|---|
| 5,226,738 A | * | 7/1993 | Valette et al. | 384/513 |
| 5,490,732 A | | 2/1996 | Hofmann et al. | |
| 5,822,859 A | * | 10/1998 | Kessen et al. | 29/898.061 |
| 6,280,096 B1 | * | 8/2001 | Miyazaki et al. | 384/544 |
| 6,398,419 B1 | * | 6/2002 | Kashiwagi et al. | 384/537 |
| 6,422,758 B1 | * | 7/2002 | Miyazaki et al. | 384/544 |

FOREIGN PATENT DOCUMENTS

| JP | 7-305726 | 11/1995 |
|---|---|---|
| JP | 2000-211302 | 8/2000 |

* cited by examiner

*Primary Examiner*—Thomas R. Hannon
(74) *Attorney, Agent, or Firm*—Jordan and Hamburg LLP

(57) ABSTRACT

A bearing device comprising a shaft body having an axially cylindrical portion in a free end side thereof and a rolling bearing fitted around an outer peripheral surface of the shaft body, wherein the cylindrical portion is bent and deformed radially outward by a rolling caulking to be caulked thereby on an outer end face of an inner ring of the rolling bearing, and a surface roughness of the inner peripheral surface of the cylindrical portion is set to 12.5 $\mu$m or less by a ten-point mean roughness (Rz).

29 Claims, 11 Drawing Sheets

Axial direction

Axial direction

F I G. 4
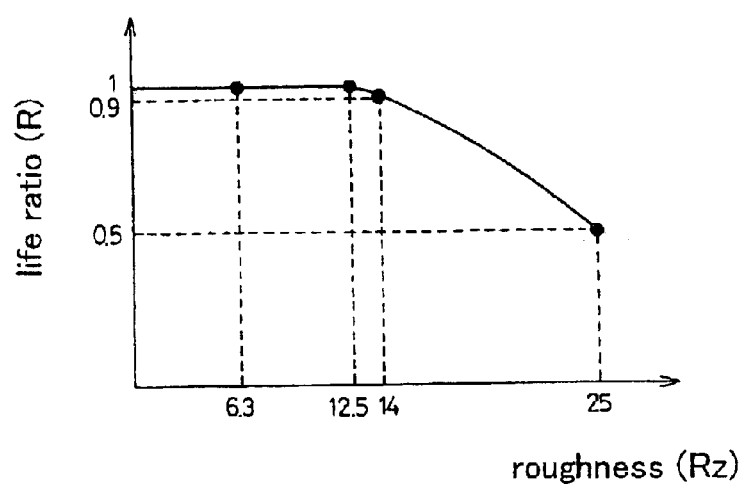

F I G. 6
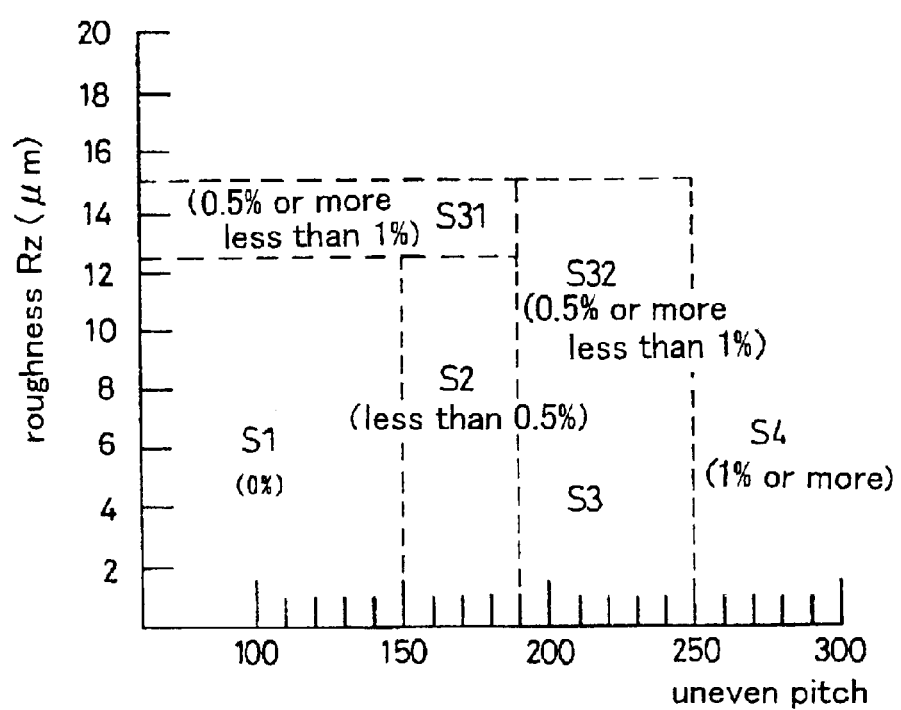

F I G. 7
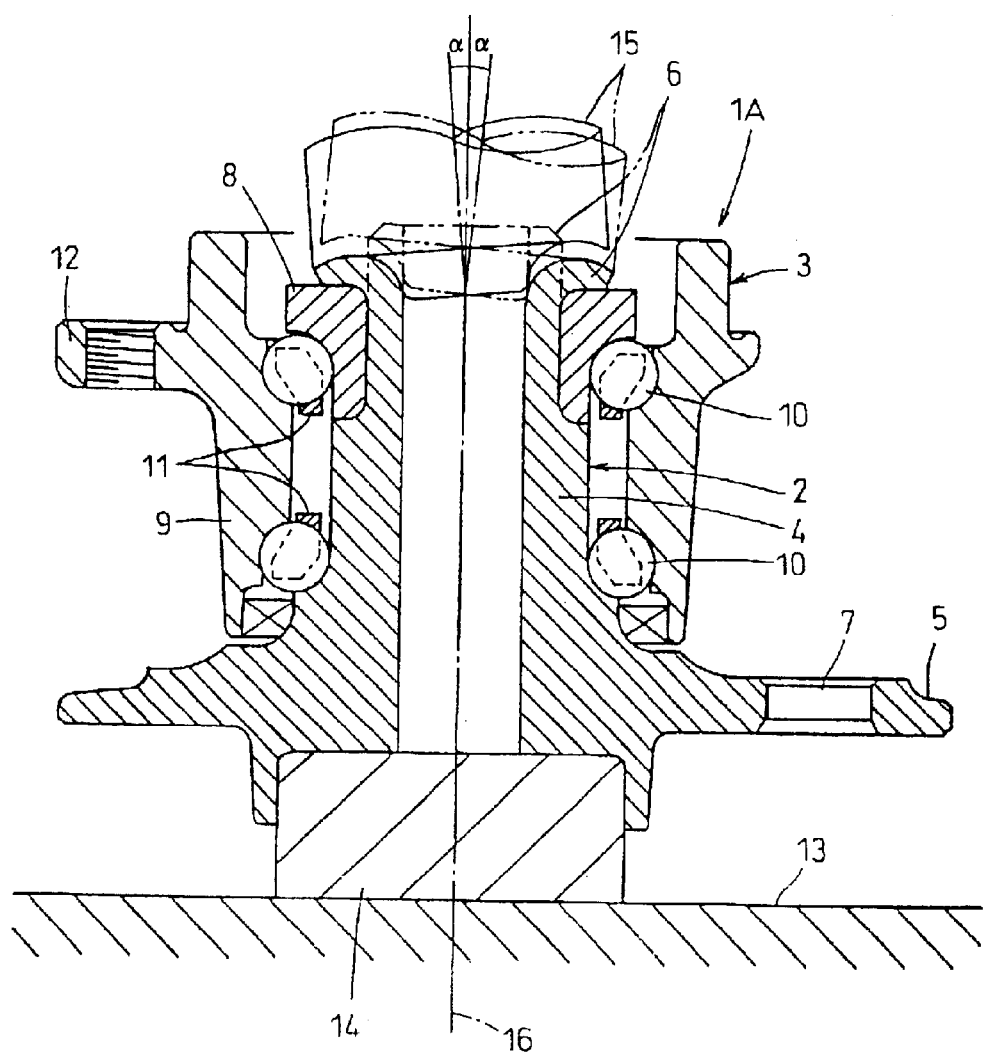

F I G. 8
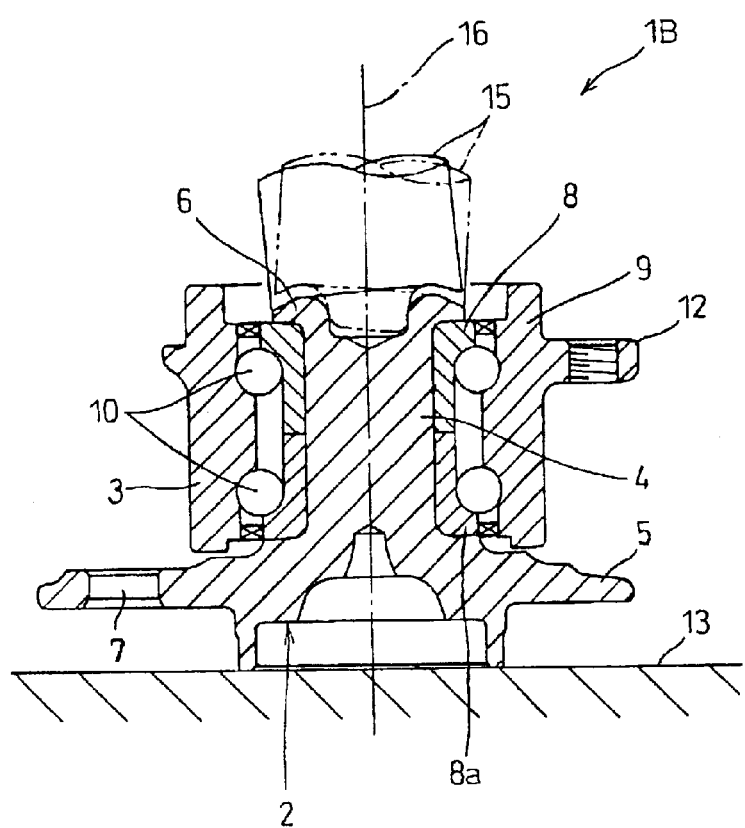

F I G. 9
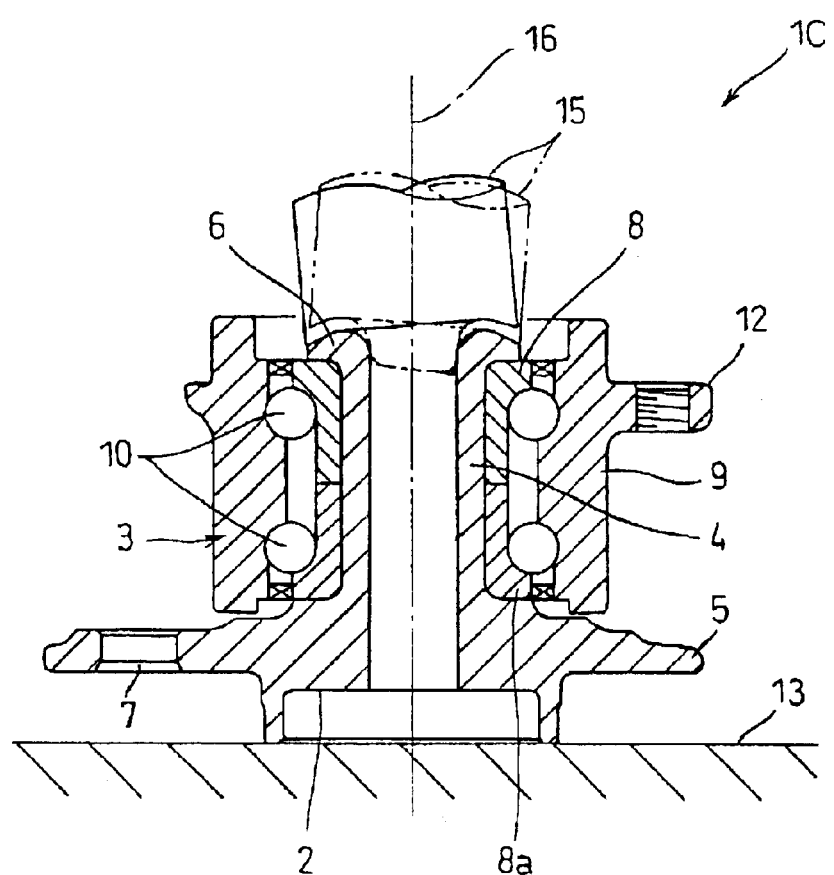

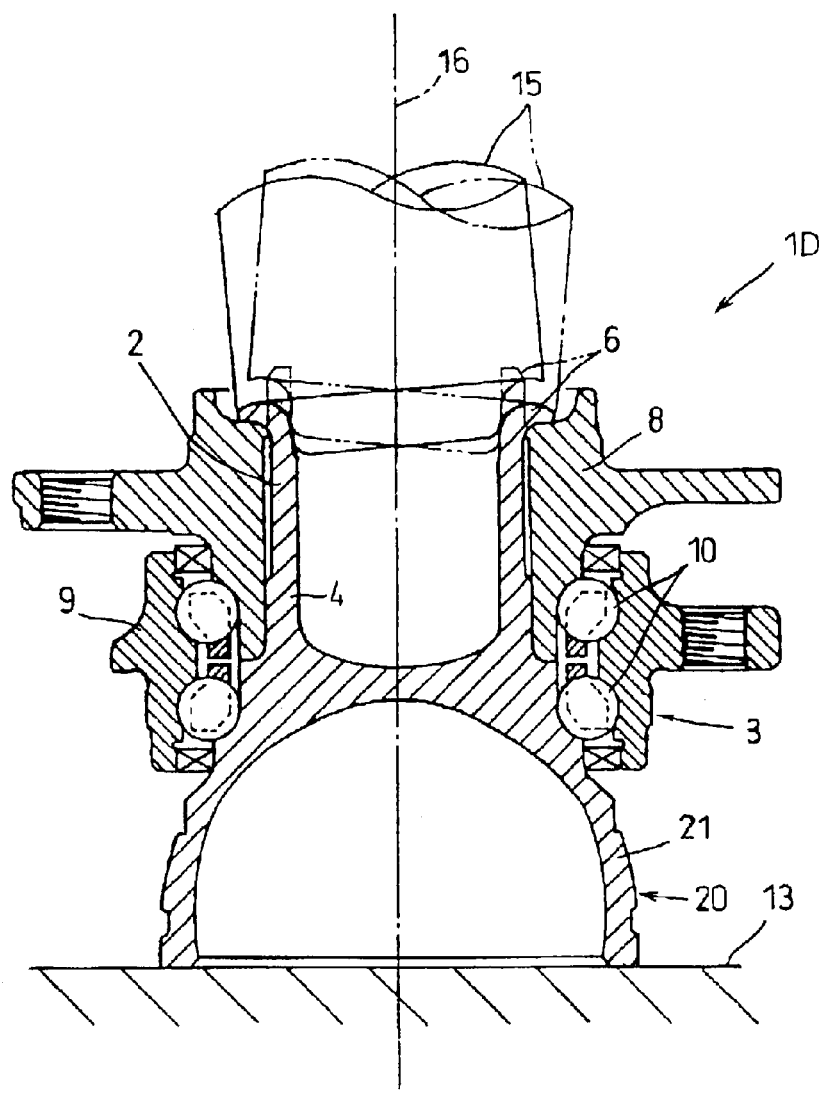
F I G. 10

F I G. 11
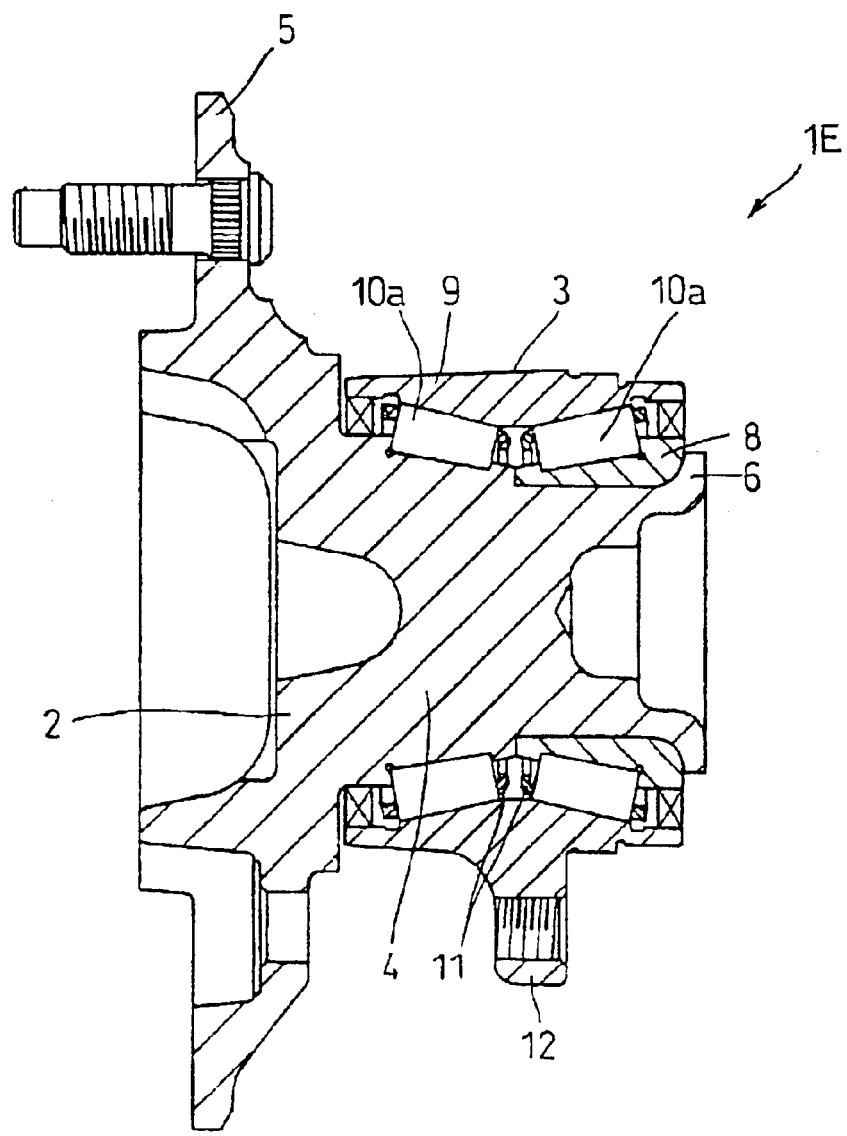

BEARING DEVICE AND METHOD OF MANUFACTURING THE BEARING DEVICE

TECHNICAL FIELD

This invention relates to a bearing device in which a rolling bearing is fitted around an outer periphery of a shaft body such as a hub unit for vehicles and a method of manufacturing the same.

BACKGROUND TECHNIQUE

Such a vehicle-use hub unit as a bearing device generally has a structure wherein a double row rolling bearing is fitted around an outer periphery of a shaft body of a hub wheel so as not to come off.

The shaft body of the hub wheel is provided in a free end side thereof with a cylindrical portion used for the bearing not to come off. The cylindrical portion, formed by a turning work, is bent and deformed radially outward by a caulking jig, thereby being caulked on an outer end surface of an inner ring which the bearing equips to constitute a caulked portion. The bearing is prevented from coming off the hub wheel by the caulked portion, and simultaneously, the inner ring of the bearing is preloaded from the caulked portion.

When the cylindrical portion is caulked on the outer end surface of the inner ring of the bearing by abutting the caulking jig on an inner peripheral surface of the cylindrical portion, an abrasion occurs. As a result of the abrasion on the inner peripheral surface of the cylindrical portion caused by a friction thereof with the caulking jig, an abrasion powder is generated. An invasion of such abrasion powder inside of the bearing may shorten a life thereof.

Under the circumstances described above, a lubricant oil used to restrain the friction adheres to the abrasion powder, which makes it extremely difficult to remove the abrasion powder which has once invaded inside of the bearing.

Therefore, a main object of the present invention is to provide a bearing device capable of restraining such abrasion powder generated at a time of a caulking work with respect to a cylindrical portion and a method of manufacturing the bearing device.

Other objects, features and advantages of the present invention will be apparent from the described hereafter.

DISCLOSURE OF THE INVENTION

A bearing device of the present invention comprises a shaft body having, in a free end side thereof, an axial caulking cylindrical portion and a rolling bearing fitted around an outer periphery of the shaft body. The cylindrical portion is bent radially outward to be caulked on an outer end face of an inner ring of the rolling bearing. A surface roughness of the inner peripheral surface of the cylindrical portion is set to a value equivalent to or less than a roughness corresponding to a life ratio regulated with respect to a bearing device having a standard life.

A shape of the cylindrical portion comprises all kinds of shapes such as a radial wall thickness is uniform, becomes gradually thinner or varies stepwise intermediately toward the free end side of the shaft body.

The machine work comprises a turning work using a turning tool, a drilling work using a drill and other works using other machine tools.

According to the bearing device of the present invention, the surface roughness of the inner peripheral surface of the cylindrical portion is set to a value corresponding to a life ratio regulated with respect to a bearing device having a standard life. Therefore, when the caulking jig is abutted on the inner peripheral surface of the cylindrical portion in order to caulk the cylindrical portion on the outer end surface of the inner ring of the bearing, an amount of abrasion powder generated therein is restrained despite a strong contact of the caulking jig with the inner peripheral surface of the cylindrical portion. Consequently, a life of the bearing is favorably lengthened by a decreased amount of the abrasion powder which invades inside of the bearing.

Also, such a laborious work as eliminating the oil-adhered abrasion powder from inside of the bearing becomes unnecessary.

As a preferable embodiment of the present invention, the surface roughness of the inner peripheral surface of the cylindrical portion is set to a value of 14.0 μm or less in a ten-point mean roughness (Rz).

As a preferable embodiment of the present invention, the surface roughness of the inner peripheral surface of the cylindrical portion is set to a value of 12.5 μm or less in a ten-point mean roughness (Rz).

BRIEF DESCRIPTION OF THE DRAWINGS

FIG. 4 is a chart showing a life comparison between an actually measured hub unit and a standard hub unit.

FIG. 6 is a chart showing a fine crack generation ratio with respect to a hub unit when a caulking cylindrical portion is caulked.

FIG. 7 is a longitudinal sectional view of a hub unit according to another mode for executing the present invention.

FIG. 8 is a longitudinal sectional view of a hub unit according to still another mode for executing the present invention.

FIG. 9 is a longitudinal sectional view of a hub unit according to still another mode for executing the present invention.

FIG. 10 is a longitudinal sectional view of a hub unit according to still another mode for executing the present invention.

FIG. 11 is a longitudinal sectional view of a hub unit according to still another mode for executing the present invention.

THE BEST MODE FOR CARRYING OUT THE INVENTION

Figure 1:
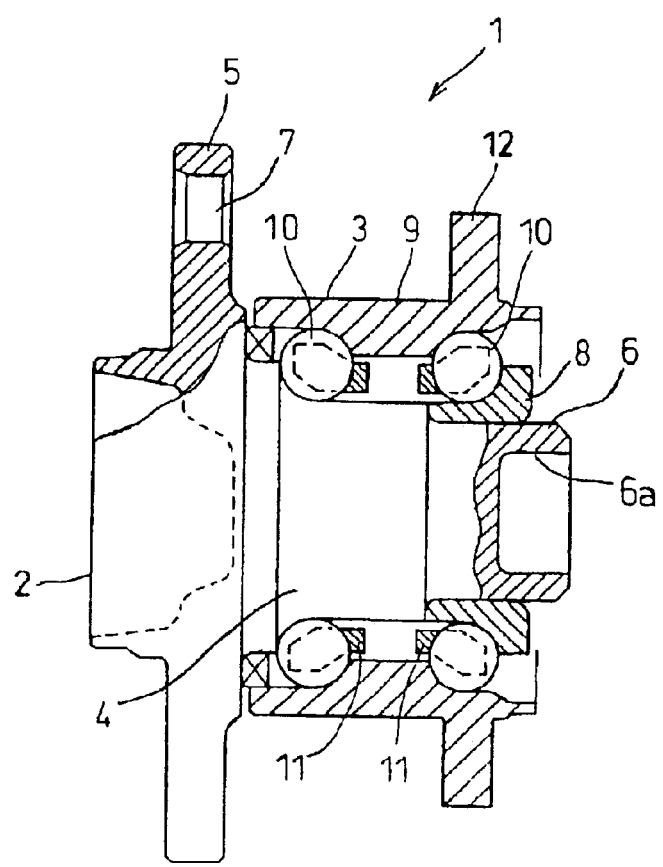
FIG. 1 is a longitudinal sectional view of a hub unit prior to a caulking work according to the best mode for executing the present invention.
Figure 1:
Figure 2:
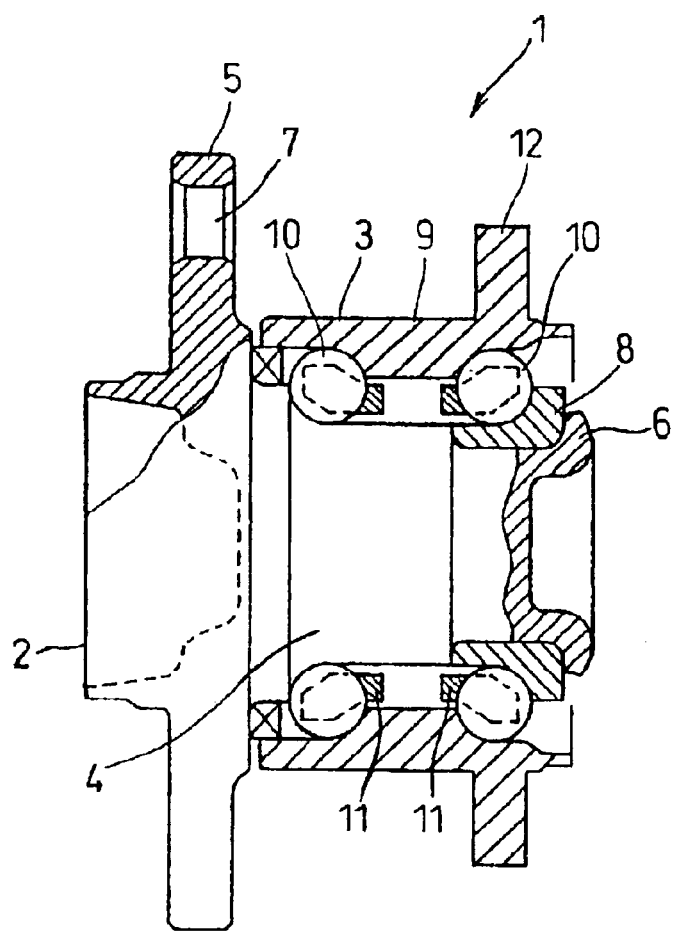
FIG. 2. is a longitudinal sectional view of a hub unit which have been caulked according to the best mode for executing the present invention.
Figure 3:
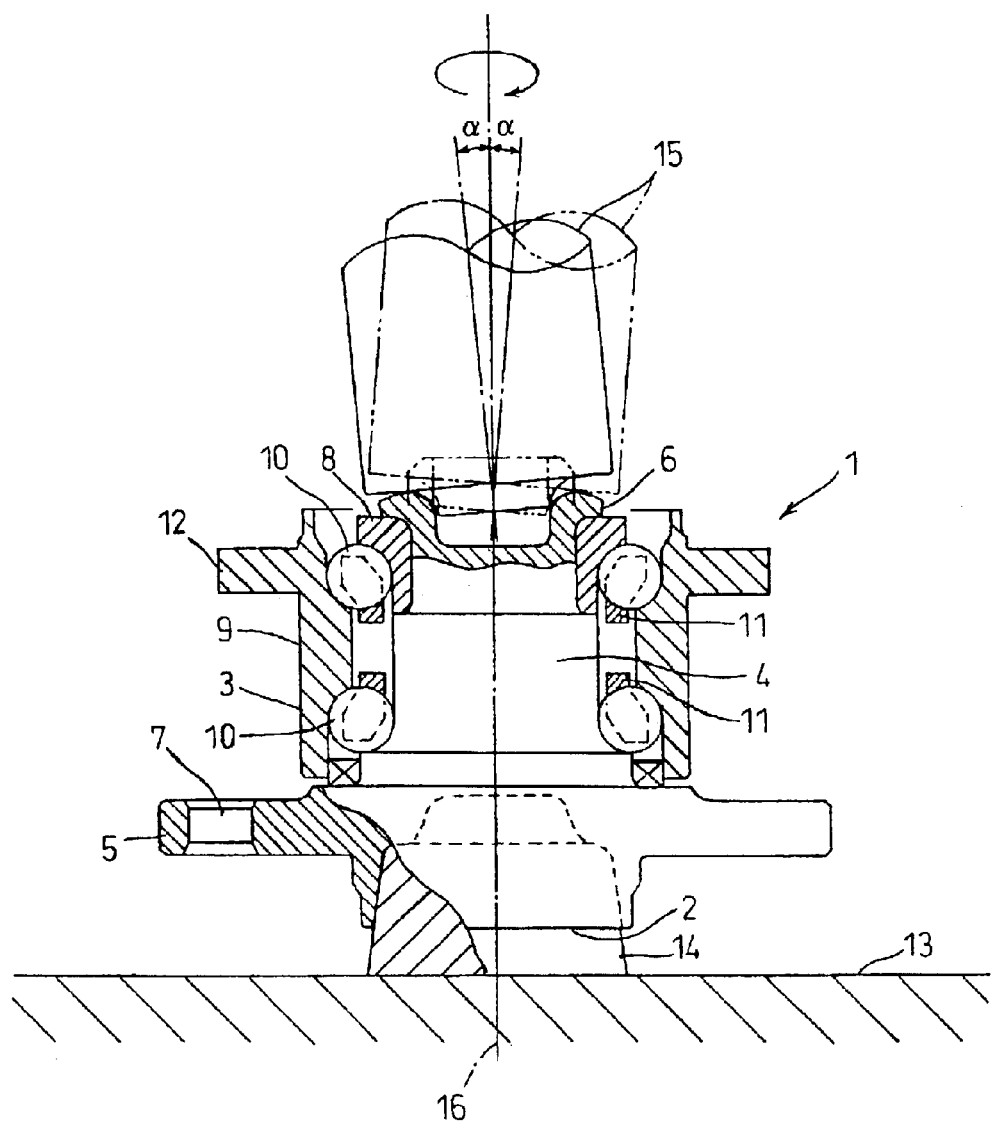
FIG. 3. is a longitudinal sectional view of a hub unit provided for explanation of a caulking work.

FIGS. 1 through 4 relate to a hub unit according to the best mode of the present invention. FIG. 1 is a longitudinal sectional view of a hub unit prior to a caulking work. FIG. 2 is a longitudinal sectional view of a hub unit which has been caulked. FIG. 3 is a longitudinal sectional view of a hub unit provided for explanation of a caulking work. FIG.

4 is a chart showing a life comparison (R) between an actually measured hub unit and a standard hub unit with respect to a surface roughness (Rz).

Referring to these figures, a vehicle-use hub unit 1 comprises a hub wheel 2, a double row angular ball bearing 3 with vertex of contact angles outside of bearing as an example of a rolling bearing.

The hub wheel 2 has a shaft body 4 and a flange 5.

The shaft body 4, in a free end side thereof, has a cylindrical portion 6 having an inner peripheral surface which axially extends.

The flange 5 of the hub wheel 2 is provided radially outward on an outer periphery of the shaft body 4 and has some bolt holes 7 in a few positions of a circumference thereof. A disk rotor and a wheel of a disk brake device, not shown, are mountable on the other end of the shaft body 4 along one side of the mounting flange 5 by bolts extending through the bolt holes 7.

Around the outer peripheral surface of the shaft body 4 is fitted the bearing 3, which has one inner ring 8 fitted around the outer peripheral surface of the shaft body, a single outer ring 9 having raceways arranged axially in two rows, a plurality of balls 10 arranged in two rows as rolling elements and two crown-shaped cages 11. The outer peripheral surface of the shaft body 4 constitutes the other inner ring of the bearing 3. On an outer peripheral surface of the outer ring 9 is provided a radially outward flange 12, through which the hub unit 1 is mounted non-rotatably to an axle not shown. The cylindrical portion 6 in the free end side of the shaft body 4 of the hub wheel 2 is bent and deformed radially outward, from a status of FIG. 1 to that of FIG. 2 to be caulked thereby on the outer end face of the inner ring 8 of the bearing 3. Such caulking is done as shown in FIG. 3.

The hub unit 1 is placed non-movably on a base 13 using a fixing jig 14.

A caulking jig 15 is rolled in an arrow direction at a required rolling angle α in a state of being abutted to the inner peripheral surface of the cylindrical portion 6. Thus the cylindrical portion 6 is bent and deformed radially outward to be caulked on the outer end face of the inner ring 8 of the bearing 3 to constitute a caulked portion. Thereby, the bearing 3 is fitted to the hub wheel 2 so as not to come off, and the inner ring 8 of the bearing 3 is preloaded from the caulked portion.

Metal powder which possibly invades inside of the bearing 3 includes abrasion powder generated on the inner peripheral surface of the cylindrical portion 6 by a frictional contact of the caulking jig 15 therewith sequent to a rolling caulking with respect to the cylindrical portion 6. An amount of the abrasion powder depends on a degree of the surface roughness of the inner peripheral surface of the cylindrical portion 6. The surface roughness corresponds to conditions of a turning work such as a speed of maneuvering a turning tool in an axial direction and a rotational speed of the cylindrical portion 6 in the turning work.

The surface roughness is defined in three different notations, which are, a mean roughness in a central line (Ra), a maximum height (Rmax) and a ten-point mean roughness (Rz) regulated in JIS (Japan Industrial Standard) B0601.

In the present invention, the surface roughness of the inner peripheral surface of the cylindrical portion 6 is denoted in a ten-point mean roughness (Rz). Below is a relation denoted in a data by an actual measurement in FIG. 4 between the surface roughness (Rz) of the inner peripheral surface of the cylindrical portion 6 and the life ratio (R). In FIG. 4, a vertical axis denotes a life ratio (R), and a horizontal axis denotes a surface roughness (Rz). The life ratio (R) denotes a ratio (R=L1/L2) of a life of an actually measured hub unit (L1) to a life of a standard hub unit (L2). In the standard hub unit, the bearing 3 is comprised to be sealed in order to completely eliminate an invasion of the abrasion powder and the surface roughness (Rz) of the inner peripheral surface of the cylindrical-portion 6 is set to 25 μm.

The standard hub unit is selected as an example of a bearing device having a standard life.

The actual measurement was executed in order for a comparison of four actually measured hub units having respectively the surface roughness (Rz) of 25.0 μm, 14, 0 μm, 12.5 μm and 6.3 μm with the standard hub unit. With regard to relation lines in FIG. 4, ● marks denote actually measured values, and values between ● marks denote assumptions.

A life test is executed in a manner that the actually measured hub units and the standard hub units are loaded with a radial load corresponding to an axle and rotated at 2000 rpm thereafter. Further, during the test, the bearing 3 is subject to a natural temperature rise and is not forcibly cooled down. A life test machine is not shown.

As a result of the life measurement, the life ratio of an actually measured hub unit with the surface roughness (Rz) of the inner peripheral surface of the cylindrical portion 6 being 25 μm to the standard hub unit is 0.5, which means the life of the actually measured hub unit is half of that of the standard hub unit.

The life ratio of an actually measured hub unit with the surface roughness (Rz) of the inner peripheral surface of the cylindrical portion 6 being 14 μm to the standard hub unit is 0.9, which means the life of the actually measured hub unit is 9/10 of that of the standard hub unit.

The life ratio of an actually measured hub unit with the surface roughness (Rz) of the inner peripheral surface of the cylindrical portion 6 being 12.5 μm to the standard hub unit is 1.0, which means the life of the actually measured hub unit is equivalent to that of the standard hub unit.

The life ratio of an actually measured hub unit with the surface roughness (Rz) of the inner peripheral surface of the cylindrical portion 6 being 6.3 μm to the standard hub unit is 1.0, which means the life of the actually measured hub unit is equivalent to that of the standard hub unit.

According to the measurement result, it is most preferable in terms of a life improvement that the surface roughness (Rz) of the inner peripheral surface of the cylindrical portion 6 of the hub unit 1 is set to 12.5 μm or less, thereby an amount of the abrasion powder generated is largely reduced to as an equivalent level as that of the standard hub unit.

The inventors of the present invention executed the actual measurement on the surface roughness (Rz) of the 4 types of hub units. It is speculated from FIG. 4 that, when the surface roughness (Rz) is up to 14.0 μm, the life ratio remains 0.9, and when the surface roughness (Rz) once exceeds 14.0 μm, the life ratio lowers by a large degree.

Another Mode for Carrying Out the Invention

1) In the case of a hub unit 1, when a cylindrical portion 6 is caulked by rolling, fine cracks are detected in an inner periphery thereof. The fine cracks, which may be a cause of an adverse influence on a state of a caulking by the cylindrical portion 6 with respect to an inner ring 8, can be however restrained by controlling a surface roughness (Rz) of the inner peripheral surface of the cylindrical portion 6.

Figure 5:
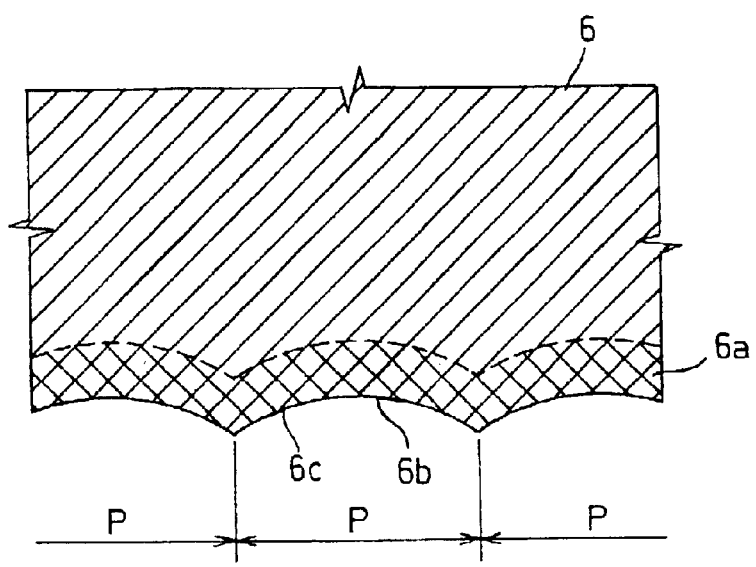
FIG. 5 is a partly enlarged view of a surface layer of an inner peripheral surface of a cylindrical portion shown in FIG. 1.

The cylindrical portion 6 is formed by a turning work using a turning tool not shown. As shown in FIG. 5, a texture of a surface layer 6a of the inner peripheral surface of the cylindrical portion 6 is degenerated into slightly stiffening or the like by the heat (a machine work heat) generated in the turning work sequent to a friction of the surface layer 6a with the turning tool in the turning work. Referring to the degenerated surface layer 6a as a machine work degenerated layer for convenience of description, the machine work degenerated layer 6a having a depth of approximately 3–5 μm from an uppermost surface thereof is generated at a corresponding depth to abut a surface of uneven portions 6c. By using the turning tool, the machine work degenerated layer 6a is heated by the machine work heat and is subject to a compression and a strain in the turning work direction. A stress, thereby, remains in the machine work degenerated layer 6a of the cylindrical portion 6. According to an actual measurement, the residual stress constitutes a circumferential compression stress or a strain stress depending on a manner of the turning work.

Furthermore, on the surface of the machine work degenerated layer 6a, is formed a trace of a streaked machine work by the turning work. A figure of the streaked machine work trace constitutes streaks 6b circumferentially formed on a surface of the machine work degenerated layer 6a. The streaks 6b comprise uneven portions 6c in the axial direction and has an uneven pitch P corresponding to a manner of the turning work.

The uneven portions 6c has a required pitch (an uneven pitch) P in the axial direction corresponding to a manner of the turning work such as a speed of maneuvering the turning tool in the axial direction and a rotational speed of the cylindrical portion 6 in the turning work.

According to an actual measurement, the residual stress within the machine work degenerated layer 6a corresponds or almost corresponds to the uneven pitch P. Again, according to an actual measurement, as the manner of the turning work are miscellaneously varied, the crack generation ratio of the fine cracks which are generated on the surface of the machine work degenerated layer 6a changes depending on a degree of the residual stress left by the respective turning works.

FIG. 6 shows a result of the actual measurements in the various turning manners. In FIG. 6, a horizontal axis denotes the uneven pitch P (μm), while a vertical axis denotes the surface roughness (Rz) of the machine work degenerated layer 6a of the inner peripheral surface of the cylindrical portion 6.

Regions S1 through S4 in FIG. 6 are hereby explained. FIG. 6 denotes plural regions S1 through S4 which control the fine crack generation ratio set by a combination of the uneven portions 6c, which is a pattern of the turning work trace formed by the turning work on the surface layer 6a of the inner peripheral surface of the cylindrical portion 6 and the surface roughness (Rz) of the surface layer 6a of the inner peripheral surface of the cylindrical portion 6.

The region S1 is constituted by a combination of the surface roughness (Rz) being 12.5 μm or less and the uneven pitch P being 150 μm or less, wherein the residual stress is zero or constitutes the compression stress. The fine crack generation ratio in the region S1 is zero. When the compression stress is a negative stress, the strain stress is, on the contrary, a positive stress, thereby the residual stress in the region S1 is zero or constitutes the negative stress.

The region S2 is constituted by a combination of the surface roughness (Rz) being 12.5 μm or less and the uneven pitch P being 150–190 μm. The residual stress constitutes a positive stress, namely the strain stress. The strength of the strain stress is 5 kgf/mm$^2$ or less. When the residual stress constitutes the strain stress, that is the positive stress, and the strength thereof is 5 kgf/mm$^2$ or less, the fine crack generation ratio in the region S2 is not zero, however does not exceed 0.5%.

The region S3 comprises a region S31 of the surface roughness (Rz) being 12.5–15 μm and the uneven pitch P being 190 μm or less and a region S32 of the surface roughness (Rz) being 15 μm or less and the uneven pitch P being 190–250 μm. The residual stress in the region S3 constitutes the positive stress, that is the strain stress. The strength of the strain stress is 5–10 kgf/mm$^2$. The fine crack generation ratio in the region S3 is 0.5% or more, which is larger than the same in the region S2, however remains less than 1.0%.

The region S4 is not comprised in the before-mentioned regions S1 through S3. The residual stress in the region S4 constitutes the positive stress, that is the strain stress, the strength of which is 10 kgf/mm$^2$ or more. The fine crack generation ratio in the region S4 is the largest in all the regions, marking 1.0% or more.

As described, when the user of the hub unit 1 demands a hub unit 1 of no fine crack generation, the region S1 is to be selected, in response to which, the residual stress is to be set to zero or to constitute the compression stress. In response to the setting, the cylindrical portion 6 is formed by the turning work.

When the hub unit 1 with less than 0.5% of the fine crack generation ratio is demanded, the region S2 is to be selected, in response to which, the residual stress is set to 5 kgf/mm$^2$ or less. In response to the setting, the cylindrical portion 6 is formed by the turning work.

When the hub unit 1 with less than 1.0% of the fine crack generation ratio is demanded, the region S3 is to be selected, in response to which, the residual stress is set to 10 kgf/mm$^2$ or less. In response to the setting, the cylindrical portion 6 is formed by the turning work.

It is known from the above result, when the cylindrical portion 6 is turned at a high turning speed, the residual stress becomes larger. In the case of the shaft body 4 having such cylindrical portion 6, therefore, the fine crack generation ratio in accordance with caulking with respect to the outer end face of the inner ring 8 becomes larger.

On the other hand, when the cylindrical portion 6 is turned at a low turning speed, the residual stress becomes smaller. In the case of the shaft body 4 having such cylindrical portion 6, therefore, the fine crack generation ratio in accordance with caulking with respect to the outer end face of the inner ring 8 becomes smaller.

Accordingly, a status of the fine crack generation can be grasped in a manufacturing stage of the cylindrical portion 6 by controlling and setting the residual stress therein.

Thus, by not only controlling the residual stress to restrain the fine crack generation caused by the rolling caulking of the cylindrical portion 6 in the surface layer of the inner peripheral surface thereof but also controlling the surface roughness (Rz) of the inner peripheral surface to restrain the fine crack generation, a hub unit of a high reliability can be preferably provided.

2) The present invention is not restricted to the hub unit of the embodiment, and can be applied to all bearing devices comprising a shaft body having an axial caulking cylindrical portion in a free end side thereof and a rolling bearing fitted around an outer periphery of the shaft body.

The present invention, for example, can applied to a hub unit shown in FIGS. 7 through 11 as in the same manner as another bearing device. In all these figures, like components are indicated by the same numerals.

A hub unit 1A in FIG. 7 constitutes a driving wheel type having a hollow shaft body 4. The hub unit 1A, except a structure of the shaft body 4, has the same structure as the hub unit 1 in FIG. 1.

A hub unit 1B in FIG. 8 constitutes a driven wheel type, wherein a bearing 3 equips two inner rings 8 and 8a located adjacent to each other in an axial direction. The hub unit 1B equips the inner ring 8a and, except the structure of the shaft body 4 corresponding thereto, has substantially the same structure as the hub unit in FIG. 1.

A hub unit 1C in FIG. 9 constitutes a driving wheel type, wherein a bearing 3 equips two inner rings 8 and 8a located adjacent to each other in the axial direction. The hub unit 1C equips the inner ring 8a, and except the structure of the shaft body 4 corresponding thereto, has substantially the same structure as the hub unit in FIG. 1.

A hub unit 1D in FIG. 10 constitutes a driving wheel type, wherein an outer ring 21 of a constant velocity joint 20 is provided in a hollow shaft body 4 as a unit.

A hub unit 1E in FIG. 11 constitutes a driven wheel type, wherein a bearing 3 constitutes a double row tapered roller bearing with vertex of contact angles outside of bearing. The bearing 3 comprises a single outer ring 9 having a double row rolling surface, a plurality of tapered rollers 10a arranged in the double row rolling surface and an inner ring 8 having a single rolling surface and fitted around an outer peripheral surface of a shaft body 4 of a hub wheel 2. In the hub unit shown in FIG. 11, the bearing 3 may comprise two inner rings located adjacent to each other in an axial direction, or may constitute a driven wheel type comprising a hollow shaft body of a hub wheel. In FIGS. 8 through 10, the hub unit is directly placed on a base 13, however is not restricted to the structure and can be placed on the base 13 by a fixing jig 14 as shown in FIG. 7.

In the case of the respective hub units 1A–1E in FIGS. 7 through 11, the cylindrical portion 6 respectively provided in a free end side of the shaft body 4 is bent and deformed radially outward by a rolling caulking, as in the same manner as the hub unit in the embodiment described earlier, to be caulked thereby on an outer end face of the inner ring 8 of the bearing 3.

The inner peripheral surface of the cylindrical portion 6 in the respective hub units has the same surface roughness (Rz) as that shown in FIG. 1, and the fine crack generation can be restrained as in the same manner as in (1).

POSSIBILITY OF INDUSTRIAL APPLICATION

The present invention can be applied to a vehicle-use hub unit wherein a disk rotor of a disk brake device and a wheel can be mounted and other bearing devices and a method of manufacturing the same.

What is claimed is:

1. A bearing device comprising:
   a shaft body having a caulking cylindrical portion formed by a machine work on a free end side thereof; and
   a rolling bearing fitted around an outer periphery of said shaft body;
   wherein said cylindrical portion is bent radially outward to be caulked on an outer end face of an inner ring of said rolling bearing; and
   a surface roughness of an inner peripheral surface of said cylindrical portion is set to a value less than a roughness corresponding to a life ratio regulated with respect to a bearing device having a standard life.

2. A bearing device according to claim 1;
   wherein said cylindrical portion is formed by a turning work.

3. A bearing device according to claim 2;
   wherein a turning work trace is formed by said turning work in said surface layer of said inner peripheral surface of said cylindrical portion;
   a figure of said turning work trace constitutes circumferential streaks formed by said turning work in said surface layer of said inner peripheral surface of said cylindrical portion; and
   a pitch formed by axially uneven portions (an uneven pitch) formed by said streaks in said surface layer of said inner peripheral surface of said cylindrical portion is set to a value of not more than 190 μm.

4. A bearing device according to claim 2;
   wherein a turning work trace is formed by said turning work in said surface layer of said inner peripheral surface of said cylindrical portion;
   a figure of said turning work trace constitutes circumferential streaks formed by said turning work in said surface layer of said inner peripheral surface of said cylindrical portion; and
   a pitch formed by axially uneven portions (an uneven pitch) formed by said streaks in said surface layer of said inner peripheral surface of said cylindrical portion is set to a value of not more than 150 μm.

5. A bearing device according to claim 1;
   wherein said cylindrical portion is bent and deformed radially outward by a rolling caulking.

6. A bearing device according to claim 1 wherein said surface roughness of said inner peripheral surface of said cylindrical portion is set to a value of not more than 14.0 μm in a ten-point mean roughness (Rz).

7. A bearing device according to claim 1 wherein said surface roughness of said inner peripheral surface of said cylindrical portion is set to a value of not more than 12.5 μm in a ten-point mean roughness (Rz).

8. A method of manufacturing a bearing device comprising:
   a shaft body having an axially cylindrical portion on a free end side thereof; and
   a rolling bearing fitted around an outer periphery of said shaft body;
   having a first step wherein said cylindrical portion is formed by a machine work; and
   a second step wherein said cylindrical portion formed by said first step is bent radially outward to be caulked thereby on an outer end face of an inner ring of said rolling bearing;
   wherein said first step sets a surface roughness of an inner peripheral surface of said cylindrical portion to a value less than a roughness corresponding to a life ratio regulated with respect to a bearing device having a standard life.

9. A method of manufacturing a bearing device according to claim 8;
   wherein said cylindrical portion is formed by a turning work.

10. A method of manufacturing a bearing device according to claim 9;
    wherein said first step sets said inner peripheral surface of said cylindrical portion according to a figure of a turning work trace generated in said surface layer of said inner peripheral surface of said cylindrical portion by said turning work.

11. A method of manufacturing a bearing device according to claim 10;
wherein a figure of said turning work trace constitutes circumferential streaks formed by a turning work in said surface layer of said inner peripheral surface of said cylindrical portion; and
a pitch formed by axially uneven portions (an uneven pitch) formed by said streaks in said surface layer of said inner peripheral surface of said cylindrical portion is set to a value of not more than 190 μm.

12. A method of manufacturing a bearing device according to claim 10;
wherein a figure of said turning work trace constitutes circumferential streaks formed by a turning work in said surface layer of said inner peripheral surface of said cylindrical portion; and
a pitch formed by axially uneven portions (an uneven pitch) formed by said streaks in said surface layer of said inner peripheral surface of said cylindrical portion is set to a value of not more than 150 μm.

13. A method of manufacturing a bearing device according to claim 8;
wherein said cylindrical portion is bent and deformed radially outward by a rolling caulking.

14. A method of manufacturing a bearing device according to claim 8;
wherein said surface roughness of said inner peripheral surface of said cylindrical portion is set to a value of not more than 14.0 μm in a ten-point mean roughness (Rz).

15. A method of manufacturing a bearing device according to claim 8;
wherein said surface roughness of said inner peripheral surface of said cylindrical portion is set to a value of not more than 12.5 μm in a ten-point mean roughness (Rz).

16. A shaft body for a bearing device comprising:
a rolling bearing fitted around an outer periphery thereof;
wherein a cylindrical portion is bent and deformed radially outward in a free end side to be caulked thereby on an outer end face of an inner ring of said rolling bearing; and
a surface roughness of an inner peripheral surface of said cylindrical portion is set to a value less than a roughness corresponding to a life ratio regulated with respect to a bearing device having a standard life.

17. A shaft body for a bearing device according to claim 16;
wherein said cylindrical portion is formed by a turning work.

18. A shaft body for a bearing device according to claim 17;
wherein a turning work trace is formed by said turning work in said surface layer of said inner peripheral surface of said cylindrical portion;
a figure of said turning work trace constitutes circumferential streaks formed by said turning work in said surface layer of said inner peripheral surface of said cylindrical portion; and
a pitch formed by axially uneven portions (an uneven pitch) formed by said streaks in said surface layer of said inner peripheral surface of said cylindrical portion is set to a value of not more than 190 μM.

19. A shaft body for a bearing device according to claim 17;
wherein a turning work trace is formed by said turning work in said surface layer of said inner peripheral surface of said cylindrical portion;
a figure of said turning work trace constitutes circumferential streaks formed by said turning work in said surface layer of said inner peripheral surface of said cylindrical portion; and
a pitch formed by axially uneven portions (an uneven pitch) formed by said streaks in said surface layer of said inner peripheral surface of said cylindrical portion is set to a value of not more than 150 μm.

20. A shaft body for a bearing device according to claim 16;
wherein said cylindrical portion is bent and deformed radially outward by a rolling caulking.

21. A shaft body for a bearing device according to claim 16;
wherein said surface roughness of said inner peripheral surface of said cylindrical portion is set to a value of not more than 14.0 μm in a ten-point mean roughness (Rz).

22. A shaft body for a bearing device according to claim 16;
wherein said surface roughness of said inner peripheral surface of said cylindrical portion is set to a value of not more than 12.5 μm in a ten-point mean roughness (Rz).

23. A method of manufacturing a shaft body for a bearing device comprising
a rolling bearing fitted around an outer periphery thereof;
wherein a cylindrical portion bent and deformed radially outward in a free end side to be caulked thereby on an outer end face of an inner ring of said rolling bearing is formed by a machine work;
wherein a surface roughness of an inner peripheral surface of said cylindrical portion is set to a value less than a roughness corresponding to a life ratio regulated with respect to a bearing device having a standard life.

24. A method of manufacturing a shaft body for a bearing device according to claim 23;
wherein said cylindrical portion is formed by a turning work.

25. A method of manufacturing a shaft body for a bearing device according to claim 24;
wherein a turning work trace is formed by said turning work in said surface layer of said inner peripheral surface of said cylindrical portion;
a figure of said turning work trace constitutes circumferential streaks formed by said turning work in said surface layer of said inner peripheral surface of said cylindrical portion; and
a pitch formed by axially uneven portions (an uneven pitch) formed by said streaks in said surface layer of said inner peripheral surface of said cylindrical portion is set to a value of not more than 190 μm.

26. A method of manufacturing a shaft body for a bearing device according to claim 24;
wherein a turning work trace is formed by said turning work in said surface layer of said inner peripheral surface of said cylindrical portion;
a figure of said turning work trace constitutes circumferential streaks formed by said turning work in said surface layer of said inner peripheral surface of said cylindrical portion; and a pitch formed by axially uneven portions (an uneven pitch) formed by said streaks in said surface layer of said inner peripheral surface of said cylindrical portion is set to a value of not more than 150 μm.

27. A method of manufacturing a shaft body for a bearing device according to claim 23;

wherein said cylindrical portion is bent and deformed radially outward by a rolling caulking.

28. A method of manufacturing a shaft body for a bearing device according to claim 23;

wherein said surface roughness of said inner peripheral surface of said cylindrical portion is set to a value of not more than 14.0 μm in a ten-point mean roughness (Rz).

29. A method of manufacturing a shaft body for a bearing device according to claim 23;

wherein said surface roughness of said inner peripheral surface of said cylindrical portion is set to a value of not more than 12.5 μm in a ten-point mean roughness (Rz).

* * * * *